United States Patent [19]
Bazes

[11] Patent Number: 5,596,489
[45] Date of Patent: Jan. 21, 1997

[54] CAPACITIVE TRANSFORMER HAVING A SWITCH RESPONSIVE TO CLOCK SIGNALS

[75] Inventor: Mel Bazes, Haifa, Israel

[73] Assignee: Intel Corporation, Santa Clara, Calif.

[21] Appl. No.: 181,590

[22] Filed: Jan. 14, 1994

[51] Int. Cl.$^6$ .................................................. H02M 3/06
[52] U.S. Cl. .............................................. 363/62; 307/109
[58] Field of Search .................................. 363/60, 62, 59; 320/1; 307/108, 109, 110

[56] References Cited

U.S. PATENT DOCUMENTS

| | | | |
|---|---|---|---|
| 4,433,282 | 2/1984 | Squires | 323/281 |
| 4,578,772 | 3/1986 | Fujii | 364/850 |
| 5,187,421 | 2/1993 | Naito | 320/1 |
| 5,339,236 | 8/1994 | Tamagawa | 363/59 |
| 5,414,614 | 5/1995 | Fette et al. | 363/59 |
| 5,461,557 | 10/1995 | Tamagawa | 363/60 |

FOREIGN PATENT DOCUMENTS

| | | | |
|---|---|---|---|
| 0186370 | 10/1983 | Japan | 363/62 |

OTHER PUBLICATIONS

Linear Technology Corporation, "1046 Datasheets, Inductorless +5V to −5V Converter", pp. 1–8, 1991.

*Primary Examiner*—Peter S. Wong
*Assistant Examiner*—Adolf Berhane
*Attorney, Agent, or Firm*—Blakely, Sokoloff, Taylor & Zafman

[57] ABSTRACT

A transformer including two half capacitive transformers operating in antiphase. Each half capacitive transformer steps an input voltage down during one phase of a clock signal. Each half capacitive transformer uses a number of capacitors and switching circuitry controlled by a clock signal. According to whether the clock signal is active or inactive, the switching circuitry places the half capacitive transformer in one of two configurations. In a first embodiment, in one configuration the capacitors are coupled in parallel between the input voltage and the output port, while in the other configuration, the capacitors are coupled in series between the output port and ground. In an alternative embodiment of the half capacitive transformer, in one configuration the capacitors are coupled in series between the input voltage and the output port while in the other configuration the capacitors are coupled in parallel between the output port and ground. The step-down ratio of the transformer is related to the number of capacitors included in a half capacitive transformer and not to the values of the capacitors. The capacitive transformer may step up voltages by swapping the input and output ports.

64 Claims, 16 Drawing Sheets

FOR 1/2 ≤ R < 1

FOR 1/2 ≥ R

CAPACITIVE TRANSFORMER HAVING A SWITCH RESPONSIVE TO CLOCK SIGNALS

FIELD OF THE INVENTION

The present invention relates to the field of power conversion. More particularly, the present invention pertains to a high efficiency D.C. to D.C. voltage converter.

BACKGROUND OF THE INVENTION

Two methods of power conversion are widely used. Linear regulation drops a supply current through a voltage equal to the desired difference between the supply voltage and the output voltage. Consequently, linear regulation wastes a great deal of power. For example, if a 5.0 volt input is to be dropped down to 3.3 volts the maximum power conversion efficiency that can be achieved is 66%. Efficiency is defined as the ratio of output power to input power. This means that 34% of the input power is wasted as heat dissipation.

Switching regulation is the other widely used method of power conversion. Switching regulators draw energy from an input supply in "packets" and temporarily store the energy in the magnetic field of a coil. The energy stored in the coil is then delivered to the load. The amount of power delivered to the load can be controlled by two methods. According to one method the amount of energy in each packet is held constant while the frequency at which the packets are drawn from the input supply is modulated. According to the second method the frequency at which the packets are drawn is held constant while the energy content of the packets is modulated in response to load requirements. Both methods generate noise pulses in the output because of the pulsed delivery of packets to the load. As a consequence, switching regulators typically use a low pass filter to remove the noise pulses from the output. That low pass filter may include a second coil to act as a choke. Switching voltage regulators cannot be fabricated as part of an integrated circuit, nor easily surface mounted within an integrated circuit package because they include coils.

The maximum theoretical power efficiency of a switching regulator is less than 100% because of the voltage drop across a coil-discharge diode within the regulator. The magnitude of the voltage drop can range between 0.5 volts to 0.7 volts. As a result, when stepping 5.0 volts down to 3.3 volts the maximum theoretical efficiency of a switching regulator is given by:

$$\text{Max Efficiency} = \frac{1}{1 + [(1-d)V_{DROP}/3.3 \text{ volts}]},$$

where $V_{DROP}$ is the voltage across the diode, and where $\delta$ is the duty cycle of coil energization, i.e., the fraction of the time the coil is connected to the supply. Under moderate lcad conditions, $\delta$ is approximately 0.5, which gives a theoretical maximum efficiently of approximately 90%. In practice, the maximum efficiency of switching regulators is less than 90% because of the non-ideality of switches and parasitic capacitance in the current path.

SUMMARY OF THE INVENTION

It is an object of the present invention to provide a power transformer with a maximum theoretical efficiency greater than that possible using linear regulators or switching regulators.

Another object of the present invention is to provide a voltage transformer with an actual efficiency of approximately 85% or greater.

Yet another object of the present invention is to provide a transformer that can step-up and step-down an input voltage.

A further object of the present invention is to provide a transformer that is relatively insensitive to large changes in load current, environmental noise and component precision.

A still further object of the present invention is to provide a transformer that reacts rapidly to load changes as a result of its open-loop structure.

Another object of the present invention is to provide a transformer that is cheaper to manufacture than a switching regulator.

A still further object of the present invention is to provide a voltage transformer that can be surface mounted inside integrated circuit packages in which a semiconductor device is mounted.

A capacitive transformer is described that includes two half capacitive transformers operating in antiphase. Each half capacitive transformer steps an input voltage down during one phase of a clock signal. Each half capacitive transformer does so using a number of capacitors and switching circuitry controlled by the clock signal. According to whether the clock signal is active or inactive, the switching circuitry places the half capacitive transformer in one of two configurations. In one configuration the capacitors are coupled in parallel between the input voltage and the output port, while in the other configuration, the capacitors are coupled in series between the output port and ground. The step-down ratio of the capacitive transformer is related to the number of capacitors included in a half capacitive transformer and not to the values of the capacitors themselves. The desired transitory response can be achieved by choosing a load capacitance in relation to the value of the capacitors within a half capacitive transformer.

An alternative embodiment of the half capacitive transformers is also described. In one configuration, the capacitors are coupled in series between the input voltage and the output port, while in the second configuration the capacitors are coupled in parallel between the output port and ground.

The capacitive transformer may be used to step up voltages by swapping the input and output ports.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which.

DETAILED DESCRIPTION

Figure 1:
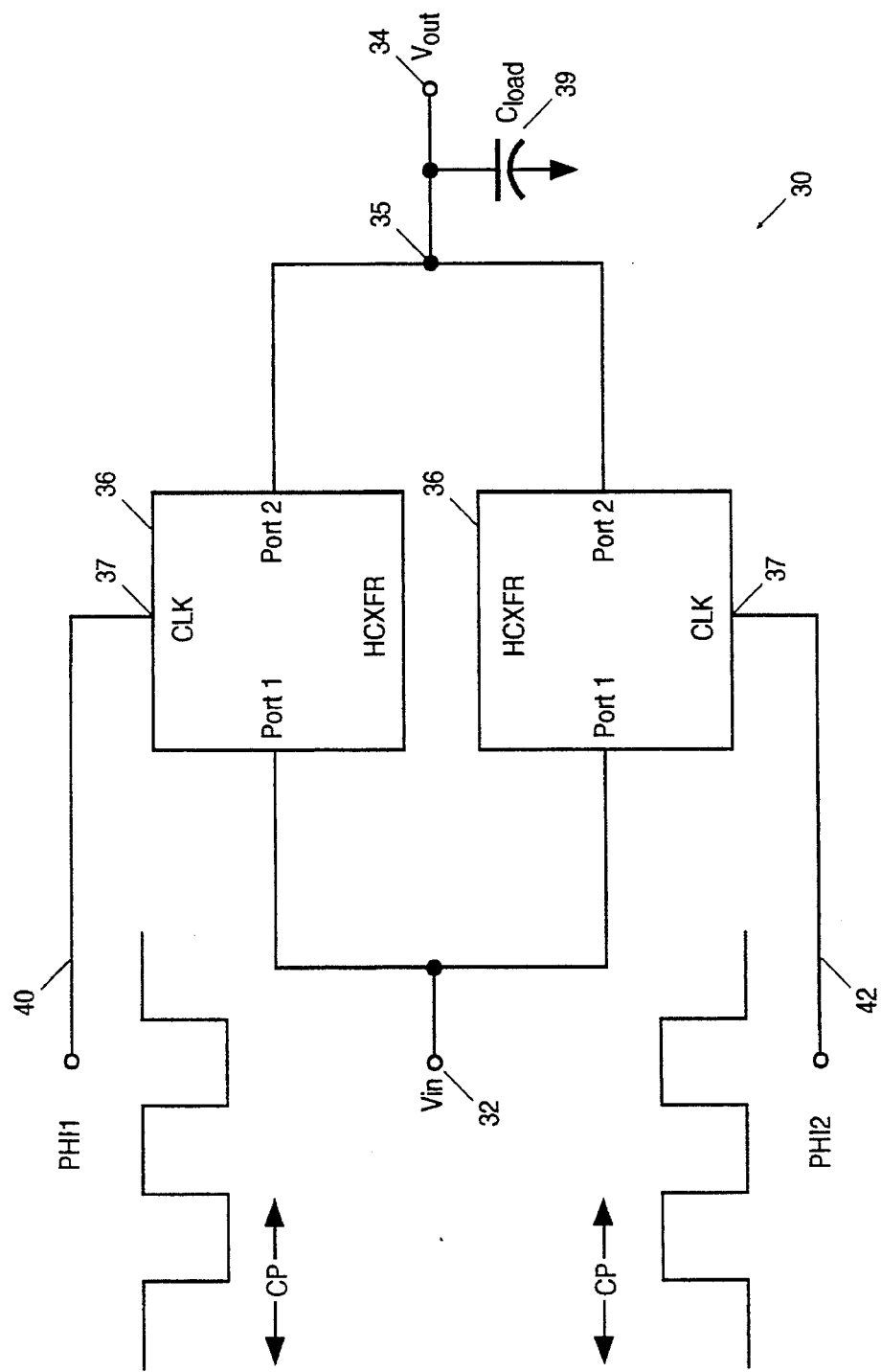
FIG. 1 is a block diagram of a capacitive transformer.

FIG. 1 illustrates in block diagram form capacitive transformer (CXFR) 30 of the present invention. Capacitive transformer 30 very efficiently transforms direct current (D.C.) input voltage $V_{in}$ 32 into D.C. output voltage $V_{out}$ 34. Capacitive transformer 30 may be fabricated as part of an integrated circuit (IC) to permit circuitry designed to operate from a 3.3 volt supply to operate directly from 5 volts. In other words, in one embodiment capacitive transformer 30 steps a 5 volt input at port 32 down to 3.3 volts at port 35. Capacitive transformer 30 operates bilaterally and may also be used to step-up D.C. voltages. That is to say, a voltage input at port 35 will be stepped up at port 32.

Capacitive transformer 30 includes two half capacitive transformers (HCXFR) 36. Half capacitive transformers 36 operate in complementary fashion because they are identical circuits controlled by complementary clock phase signals PHI1 40 and PHI2 42. Clock phase signals 40 and 42 are complementary and nonoverlapping binary signals. Stated another way, phase signals 40 and 42 each have two phases, one active and the other inactive, per clock period. Only one clock phase signal 40 or 42 is active at a time.

Figure 2:
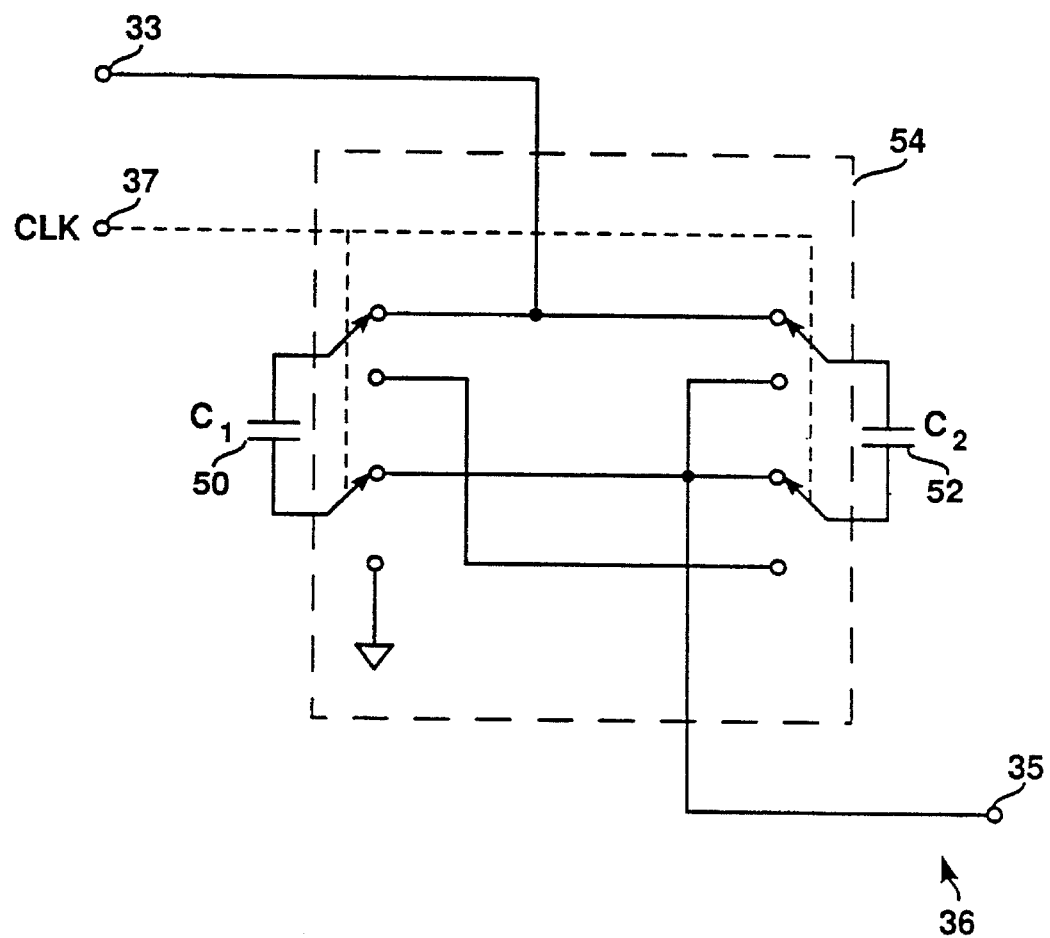
FIG. 2 is a schematic diagram of a half capacitive transformer.

FIG. 2 illustrates schematically an embodiment of a half capacitive transformer 36. HCXFR 36 includes two capacitors 50 and 52 and switching circuitry 54. Switching circuitry 54 includes a single-pole-double-throw (SPDT) switch coupled to each plate of capacitors 50 and 52. The position of each switch is controlled by clock input 37. Thus, switching circuitry 54 places capacitors 50 and 52 in two different configurations according to whether the phase signal applied to clock input 37 is active or inactive.

Figure 3A:
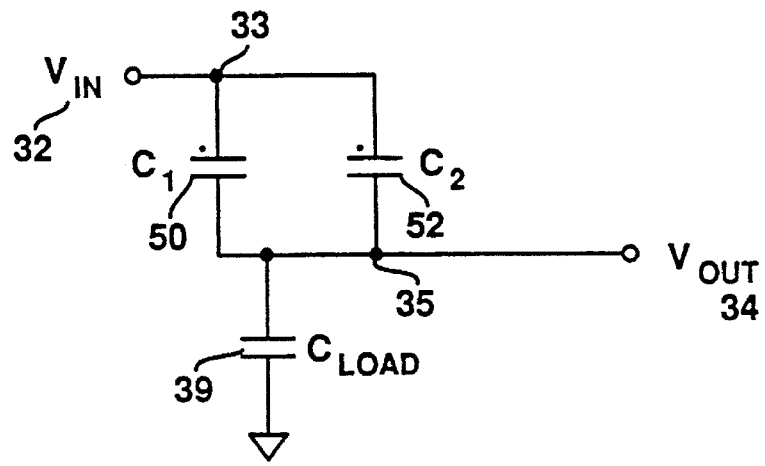
FIG. 3A illustrates one configuration of a half capacitive transformer.
Figure 3B:
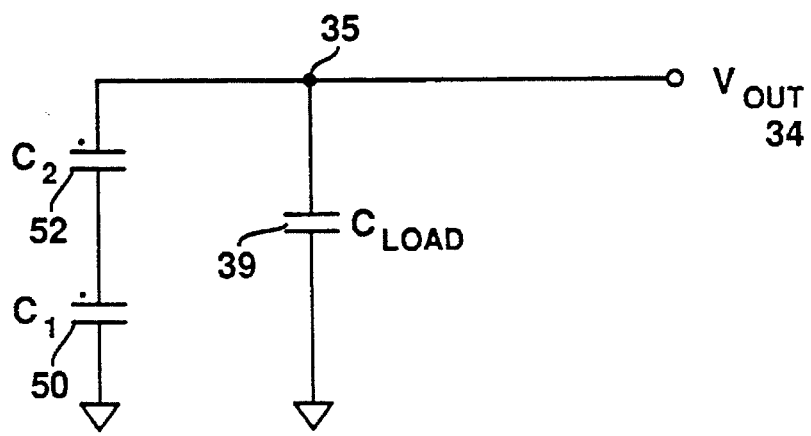
FIG. 3B illustrates the other configuration of a half capacitive transformer.

HCXFR 36 steps $V_{in}$ 32 down to generate $V_{out}$ 34. HCFXR 36 of FIG. 2 provides an accurate stepping ratio of ⅔ even when inaccurate capacitors 50 and 52 are used. The relationship of $V_{out}$ 34 to $V_{in}$ 32 can be determined by applying the rule of charge conservation to the redistribution of charge within HCXFR 36 during three consecutive phases of clock input 37. Let us call the first of the three consecutive phases phase 1 of clock cycle n–1 and denote it in the following equations as: n–1, PHI1. During this phase HXCFR 36 is in the configuration illustrated in FIG. 3A. In FIGS. 3A and 3B and subsequent figures the dots near capacitors 50 and 52 serve only to differentiate between the two capacitor plates. Similarly, the second of the three consecutive phases is called phase 2 of clock cycle n–1 and is denoted as: n–1, PHI2. During n–1, PHI2 HCXFR 36 is in the configuration illustrated in FIG. 3B. Finally, the third of the consecutive phases is called phase 1 of clock cycle n and is denoted as: n, PHI1. HCXFR 36 returns to the configuration of FIG. 3A during the third consecutive phase.

The charge stored on capacitors 50, 52 and 39 during the first of the three consecutive phases are:

$$Q_1(n-1, PHI1)=C_1[V_{IN}-V_{OUT}(n-1, PHI1)], \quad (Eq. 1)$$

$$Q_2(n-1, PHI1)=C_2[V_{IN}-V_{OUT}(n-1, PHI1)], \quad (Eq. 2)$$

$$Q_{LOAD}(n-1, PHI1)=C_{LOAD} \times V_{OUT}(n-1, PHI1). \quad (Eq. 3)$$

During the second of the consecutive phases, the total charge within HCXFR 36 remains the same; however, some charge from capacitors 50 and 52 is redistributed to capacitor 39. Denote this change in charge as $\Delta Q(n-1, PHI2)$. Thus, the charge on capacitors 50, 52 and 39 during the second phase can be expressed as:

$$Q_1(n-1, PHI2)=C_1[V_{IN}-V_{OUT}(n-1, PHI1)]-\Delta Q(n-1, PHI2), \quad (Eq. 4)$$

$$Q_2(n-1, PHI2)=C_2[V_{IN}-V_{OUT}(n-1, PHI1)]-\Delta Q(n-1, PHI2), \quad (Eq. 5)$$

$$Q_{LOAD}(n-1, PHI2)=C_{LOAD} \times V_{OUT}(n-1, PHI1)+\Delta Q(n-1, PHI2). \quad (Eq. 6)$$

The new output voltage, $V_{OUT}(n-1, PHI2)$, is given by $$V_{OUT}(n-1,PHI2) = \frac{Q_1(n-1,PHI2)}{C_1} + \frac{Q_2(n-1,PHI2)}{C_2}. \quad (Eq. 7)$$

$V_{OUT}(n-1, PHI2)$ is also given by $$V_{OUT}(n-1,PHI2) = \frac{Q_{LOAD}(n-1,PHI2)}{C_{LOAD}}. \quad (Eq. 8)$$

By substituting Eq. 4, Eq. 5 and Eq. 6 into Eq. 7 and Eq. 8, we arrive at two equations in two unknowns: $V_{OUT}(n-1, PHI2)$ and $\Delta Q(n-1, PHI2)$. Once we have solved for $\Delta Q(n-1, PHI2)$ we can solve for the charges on the three capacitors using Eq. 4, Eq. 5 and Eq. 6.

During the final of the three consecutive phases the charge on capacitors 50 and 52 is the sum of the charges from the two previous phases plus a small charge that flows into them from $V_{in}$ 32. Designate that change in charge as $\Delta Q(n, PHI1)$. Thus, the charge on capacitors 50, 52 and 39 during the last clock phase is given by:

$$Q_1(n,PHI1) = C_1[V_{IN} - V_{OUT}(n-1,PHI1)] - \quad (Eq. 9)$$

-continued $$\Delta Q(n-1, PHI2) + \frac{C_1}{C_1 + C_2} \cdot \Delta Q(n, PHI1),$$

$$Q_2(n, PHI1) = C_2[V_{IN} - V_{OUT}(n-1, PHI1)] - \quad \text{(Eq. 10)}$$

$$\Delta Q(n-1, PHI2) + \frac{C_2}{C_1 + C_2} \cdot \Delta Q(n, PHI1),$$

$$Q_{LOAD}(n, PHI1) = C_{LOAD} \times V_{OUT}(n-1, PHI1) + \quad \text{(Eq. 11)}$$

$$\Delta Q(n-1, PHI2) + \Delta Q(n, PHI1).$$

The new output voltage $V_{OUT}(n, PHI1)$ is given by $$V_{OUT}(n, PHI1) = V_{IN} - \frac{Q_1(n, PHI1) + Q_2(n, PHI1)}{C_1 + C_2}. \quad \text{(Eq. 12)}$$

$V_{OUT}(n, PHI1)$ is also given by $$V_{OUT}(n, PHI1) = \frac{Q_{LOAD}(n, PHI1)}{C_{LOAD}}. \quad \text{(Eq. 13)}$$

By substituting Eq. 9, Eq. 10 and Eq. 11 into Eq. 12 and Eq. 13, we arrive at two equations in two unknowns: $V_{OUT}(n, PHI1)$ and $\Delta Q(n, PHI1)$.

Solving these two equations for $V_{OUT}(n, PHI1)$ as a function of $V_{OUT}(n-1, PHI)$, and calling $V_{OUT}(n, PHI1)$ $V_{OUT}(n)$ and calling $V_{OUT}(n-1, PHI1)$ $V_{OUT}(n-1)$, the following equation is obtained:

$$V_{OUT}(n) = \alpha \cdot V_{IN} + \beta \cdot V_{OUT}(n-1), \quad \text{(Eq. 14)}$$

where $\alpha$ and $\beta$ are given by $$\alpha = \frac{[2C_1 \cdot C_2 + (C_1 + C_2)^2]C_{LOAD}}{[C_1 \cdot C_2 + (C_1 + C_2)C_{LOAD}](C_1 + C_2 + C_{LOAD})}, \quad \text{(Eq. 15)}$$

and $$\beta = \frac{(C_1 + C_2)(C_1 \cdot C_2 + C_{LOAD}^2) - \left[ 2C_1 \cdot C_2 + \frac{(C_1 + C_2)^2}{2} \right] C_{LOAD}}{[C_1 \cdot C_2 + (C_1 + C_2)C_{LOAD}](C_1 + C_2 + C_{LOAD})}. \quad \text{(Eq. 16)}$$

Solving Equation 14 recursively, we get $$V_{OUT}(n) = \left( \frac{\alpha}{1-\beta} \right) V_{IN} + \quad \text{(Eq. 17)}$$

$$\beta^n \left[ V_{OUT}(0) - \left( \frac{\alpha}{1-\beta} \right) V_{IN} \right] =$$

$$\frac{2}{3} V_{IN} + \beta^n \left[ V_{OUT}(0) - \frac{1}{3} V_{IN} \right].$$

$\beta$ is less than 1 for $0 < C_{LOAD} < \infty$, i.e., for any practical value of $C_{LOAD}$. Therefore, as n increases towards $\approx$, $\beta^n$ tends towards zero, and we get $$\lim_{n \to \infty} V_{OUT}(n) = \frac{2}{3} V_{IN} \quad \text{(Eq. 18)}$$

Thus, as stated previously, according to equation 18 the step-down ratio of HCXFR 36 is independent of the values of capacitors 50 and 52. The only requirement is that capacitor 39 have a non-zero value. Therefore, accurate step-down ratios can be obtained using inaccurate capacitors.

The transient response of $V_{out}$, as a function of n, can be graphed by computing $\beta$ for assumed values of capacitors $C_1$ 50, $C_2$ 52 and then solving equation 17. The simplest case is when $C_1$ and $C_2$ are equal to the same value, which we will designate C. Defining $x = C_{LOAD}/C$ then $\alpha$ and $\beta$ are given by $$\alpha = \frac{6x}{(2x+1)(x+2)}, \quad \text{(Eq. 19)}$$

and $$\beta = \frac{2(x-1)^2}{(2x+1)(x+2)}. \quad \text{(Eq. 20)}$$

An examination of the behavior of $V_{OUT}$ during each clock phase shows that $$V_{OUT}(n, PHI_1) = \alpha' \cdot V_{IN} + \beta' \cdot V_{OUT}(n-1), \quad \text{(Eq. 21)}$$

where $V_{OUT}(n, PHI_1)$ is the value of $V_{OUT}$ at the end of $PHI_1$ in clock n. Furthermore, $$V_{OUT}(n) = \alpha'' \cdot V_{IN} + \beta'' \cdot V_{OUT}(n, PHI_1) = \alpha \cdot V_{IN} + \beta \cdot V_{OUT}(n-1), \quad \text{(Eq. 22)}$$

where $\alpha'$, $\alpha''$, $\beta'$, and $\beta''$ are given by:

$$\alpha' = \frac{2}{2x+1} \quad \text{(Eq. 23)}$$

$$\beta' = \frac{2(x-1)}{2x+1} \quad \text{(Eq. 24)}$$

$$\alpha'' = \frac{2}{x+2} \quad \text{(Eq. 25)}$$

and $$\beta'' = \frac{x+1}{x+2}. \quad \text{(Eq. 26)}$$

The relationships of $\alpha$ and $\beta$ to $\alpha'$, $\alpha''$, $\beta'$, and $\beta''$ are given by:

$$\alpha = \alpha'' + \beta'' \cdot \alpha' = \frac{6x}{(2x+1)(x+2)} \quad \text{(Eq. 27)}$$

and $$\beta = \beta' \cdot \beta'' = \frac{2(x-1)^2}{(2x+1)(x+2)} \quad \text{(Eq. 28)}$$

which correspond exactly to Equations 19 and 20.

From equations 24 and 26, $V_{OUT}$ 34 has an oscillatory transient characteristic for $C_{LOAD}$ less than C and an exponential-decay transient characteristic for $C_{LOAD}$ greater than C. Furthermore, $V_{OUT}$ 34 has a null in its transient characteristic, i.e., it responds instantaneously, when $C_{LOAD} = C$.

The transient behavior of $V_{OUT}$ in the time domain can be obtained by substituting $t/T_p$ for n in equation 17, where t is the elapsed time and $T_p$ is the time period of the phase signal applied to clock input 37. Equation 17 then becomes:

$$V_{OUT}(t) = \frac{2}{3} V_{IN} + e^{-t/\tau}[V_{OUT}(0) - \frac{2}{3} V_{IN}], \quad \text{(Eq. 29)}$$

where $\tau = -T_p/\ln\beta$.

Figure 4A:
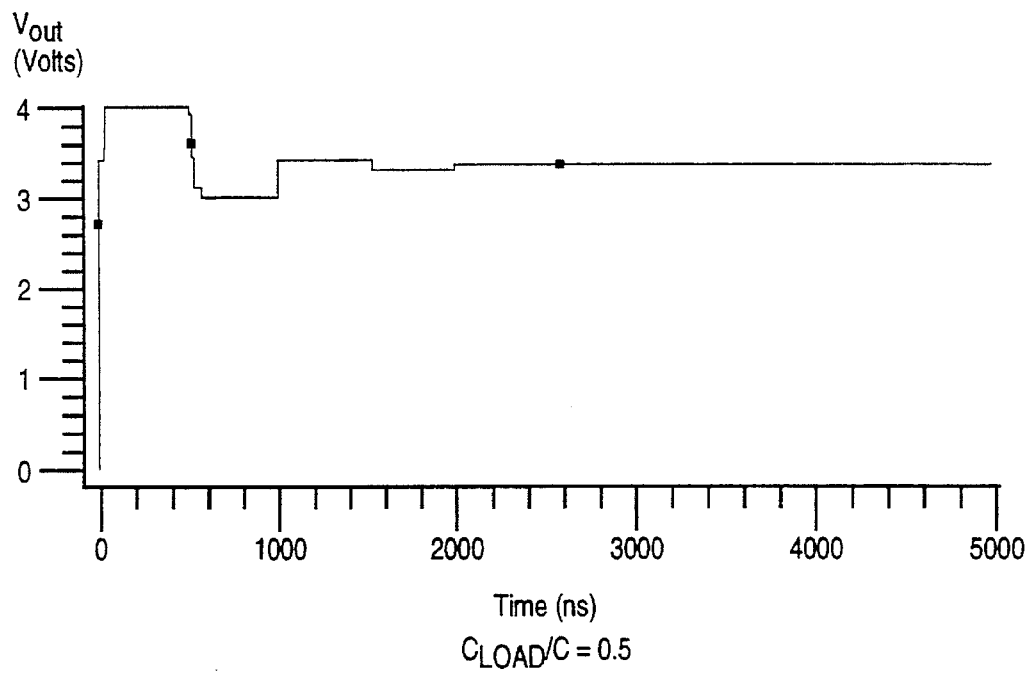
FIG. 4A illustrates the transitory response of a half capacitive transformer for $C_{LOAD}/C$ equal to 0.5.
Figure 4B:
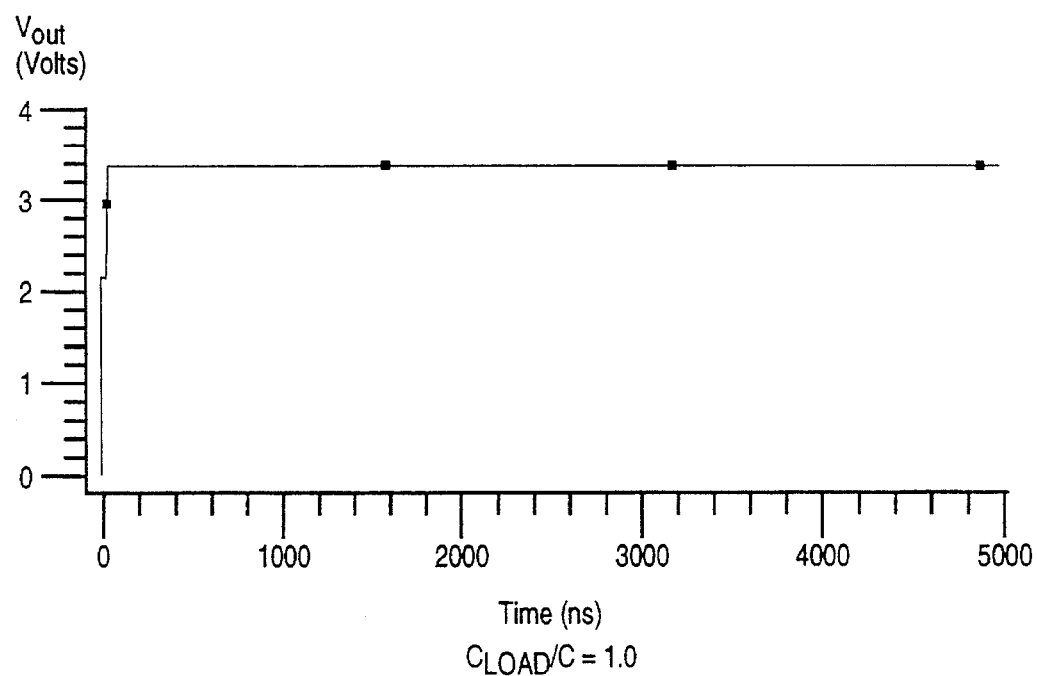
FIG. 4B illustrates the transitory response of a half capacitive transformer for $C_{LOAD}/C$ equal to 1.0.
Figure 4C:
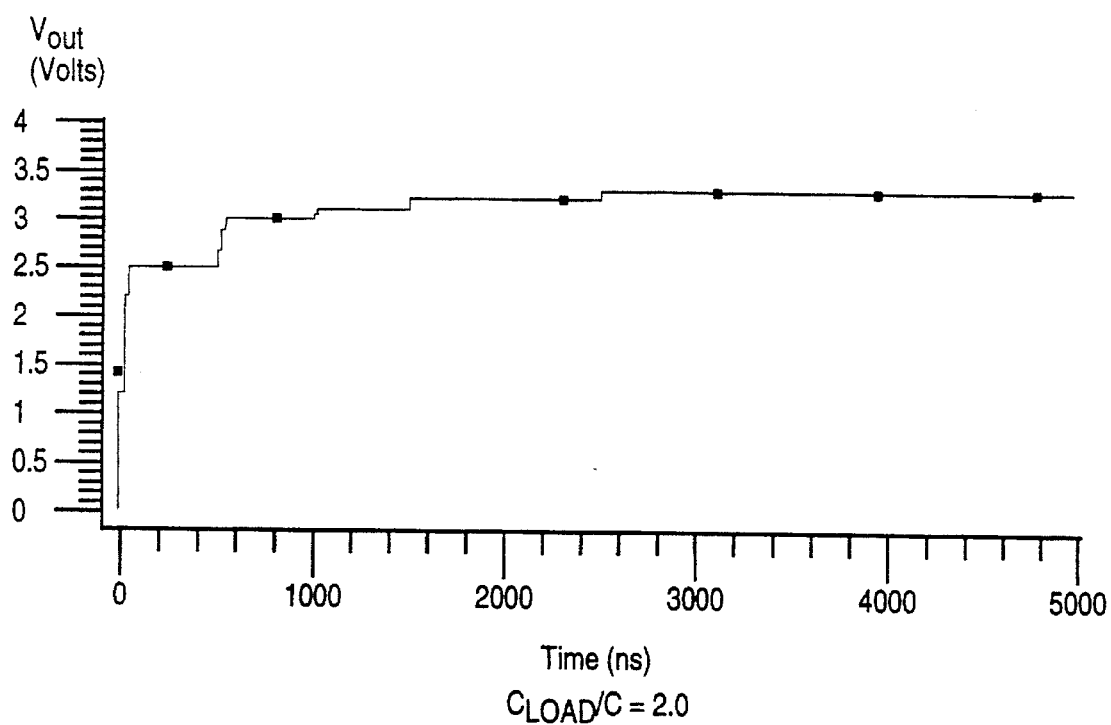
FIG. 4C illustrates the transitory response of a half capacitive transformer for $C_{LOAD}/C$ equal to 2.0.

FIGS. 4A, 4B and 4C illustrate simulation results which confirm equation 29 under three different conditions. FIG. 4A illustrates the results of simulation for $C_{LOAD}$ equal to 0.5 C. The simulation confirms the oscillatory transient characteristic expected. FIG. 4B illustrates the result of a simulation for $C_{LOAD}$ equal to C. Again, the simulation confirms the expected null in the transient characteristic. Finally, FIG. 4C illustrates exponential delay in the transient characteristic for $C_{LOAD}$ greater than C.

A single HCXFR 36 within CXFR 30 draws current from Vin 32 during only half the clock period. Power is, therefore, drawn from the HCXFR 36 only during half the clock period so that its output voltage fluctuates between each half of the clock period. CXFR 30 does not exhibit the same characteristics because the pair of HCXFRs 36 are connected in parallel and operate in antiphase. Therefore, the CXFR 30 draws essentially a D.C. current from $V_{in}$ 32 throughout the clock period. So, power is drawn from CXFR 30 during the entire clock period, minimizing voltage fluctuations in $V_{out}$ 34.

The relationship of $V_{out}$ 34 to Vin 32 within CXFR 30 is described by equation 17, which was derived during the discussion of the behavior of a HCXFR. However, $\alpha$ and $\beta$ for the full CXFR are given by:

$$\alpha = \frac{6}{2x+5}, \qquad \text{(Eq. 30)}$$

and $$\beta = \frac{2(x-2)}{2x+5}. \qquad \text{(Eq. 31)}$$

Furthermore, the definition of n when equation 17 is applied to CXFR 30 differs from that when equation 17 is applied to a HCXFR 36. Within a half capacitive transformer 36 n refers to the number of elapsed clock periods; however, within capacitive transformer 30 n refers to the number of elapsed phase periods. Because CXFR 30 employs two HCXFRs operating in antiphase, CXFR 30 changes configurations twice as many times per clock period as a HCXFR. Thus, when equation 17 is applied to CXFR 30 $\tau$ equals $-T_p/2\ln\beta$ rather than $-T_p/\ln\beta$ as with a HCXFR.

The step-down ratio of CXFR 30 is also given by equation 18, which describes the step-down ratio of a HCXFR 36, for any practical value of $C_{LOAD}$. In other words, the step-down ratio of CXFR 30 is also ⅔. Equation 18 holds for CXFR 30 because the absolute value of $\beta$ is less than 1 for $0 \leq x \ll \infty$.

The step-down ratio of CXFR 30 should remain unchanged at ⅔ even if unequal capacitor values are used. This is because the values of capacitors do not effect the ratio of $\alpha/(1-\beta)$ even though $\alpha$ and $\beta$ are changed from those given in Equations 30 and 31.

Figure 5A:
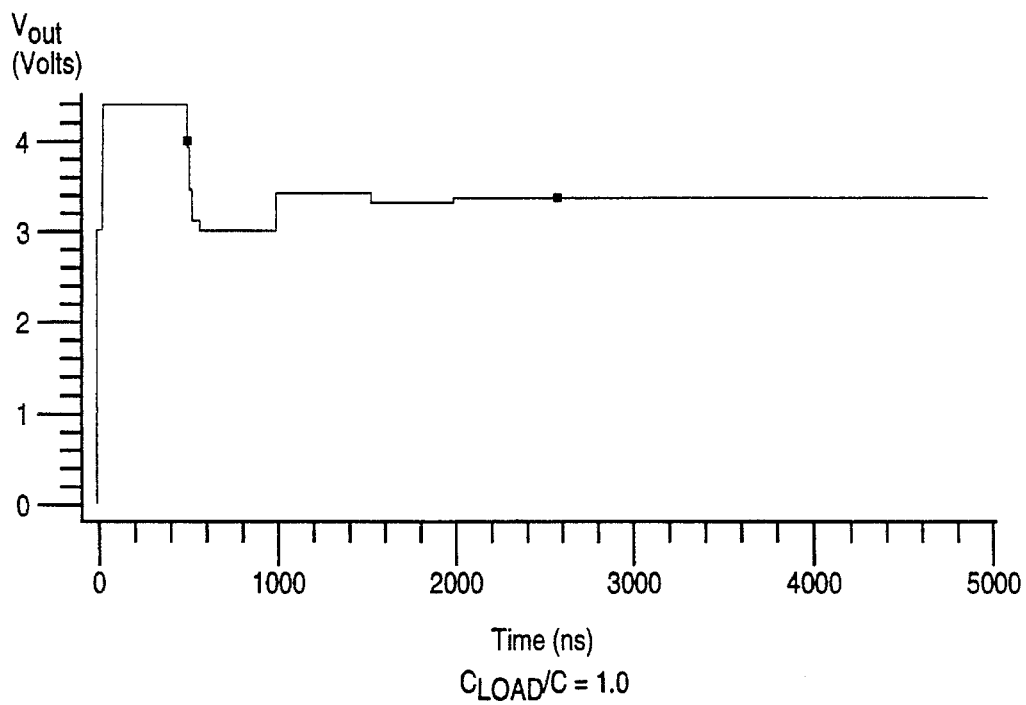
FIG. 5A illustrates the transitory response of a capacitive transformer for $C_{LOAD}/C$ equal to 1.0.
Figure 5B:
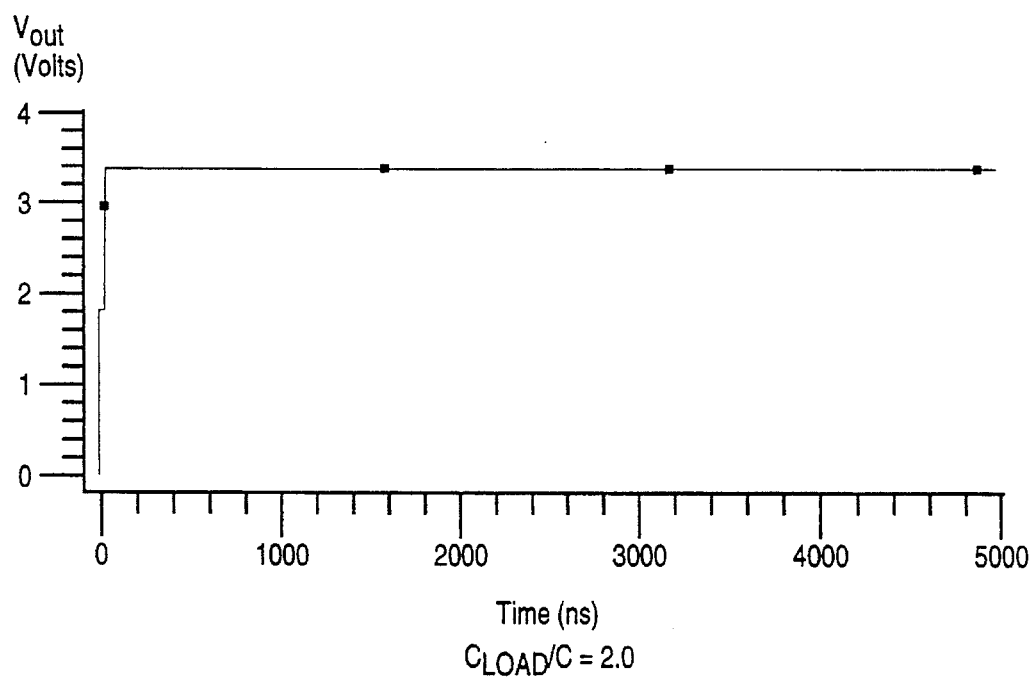
FIG. 5B illustrates the transitory response of a capacitive transformer for $C_{LOAD}/C$ equal to 2.0.
Figure 5C:
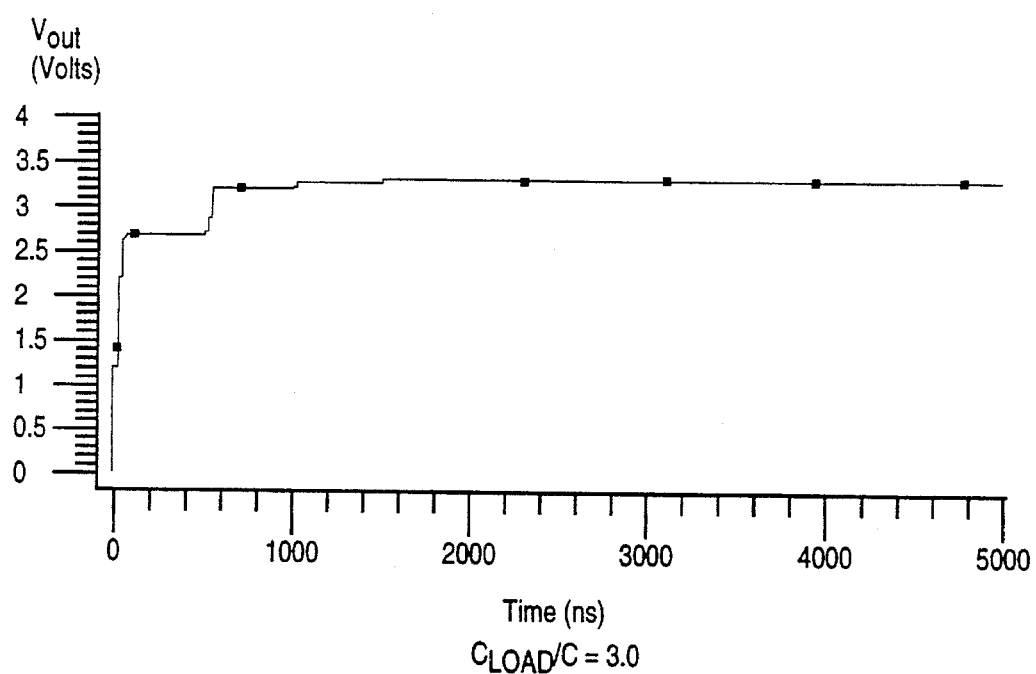
FIG. 5C illustrates the transitory response of a capacitive transformer for $C_{LOAD}/C$ equal to 3.0.

The transient response of VOUT exhibits three different regimes for CXFR 30, as with HCXFR 36. For CXFR 30, equation 31 dictates the boundaries of the regimes, whereas for HCXFR 36 the boundaries are dictated by equations 24 and 26. Thus, according to equation 31 it is anticipated that $V_{OUT}$ 34 will exhibit an oscillatory transient for values of $C_{LOAD} < 2C$. For values of $C_{LOAD} > 2C$, $V_{OUT}$ 34 displays a transient exponential decay characteristic. $V_{OUT}$ 34 displays an instantaneous transitory response at $C_{LOAD} 2C$. Computer simulations of $V_{OUT}$ 34 bear out the transitory response predicted by equation 31. FIGS. 5A, 5B and 5C illustrates the computer simulations. FIG. 5A illustrates an oscillatory transient response for $C_{LOAD}/C=1$. FIG. 5B illustrates an instantaneous response of $V_{OUT}$ 34 for $C_{LOAD}/C=2$. Finally, FIG. 5C displays an exponential decay in the transitory response of $V_{OUT}$ 34 for $C_{LOAD}/C=3$.

Figure 6:
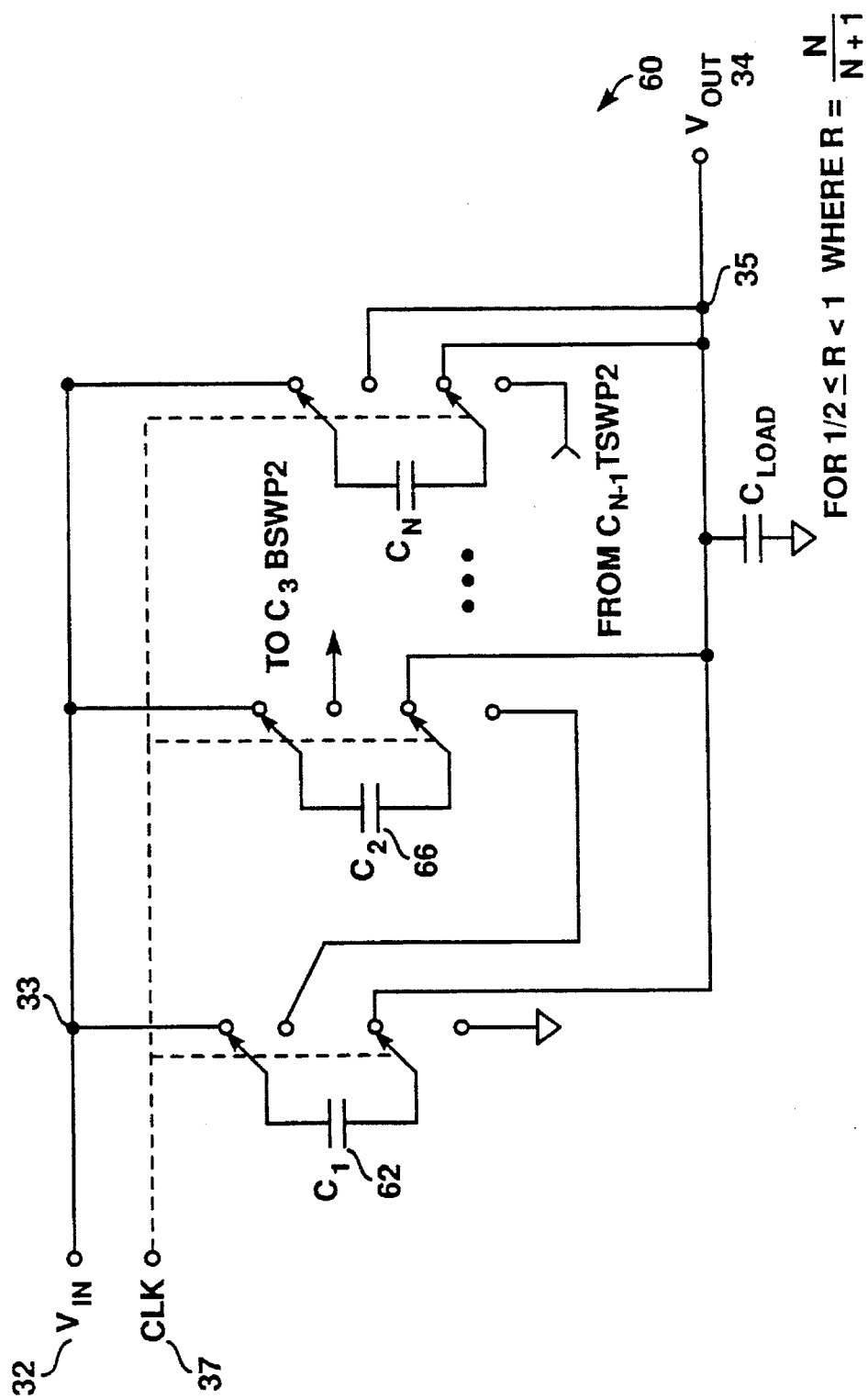
FIG. 6 illustrates schematically the general form of a half capacitive transformer having a step-down ratio greater than or equal to ½ and less than one.
Figure 7A:
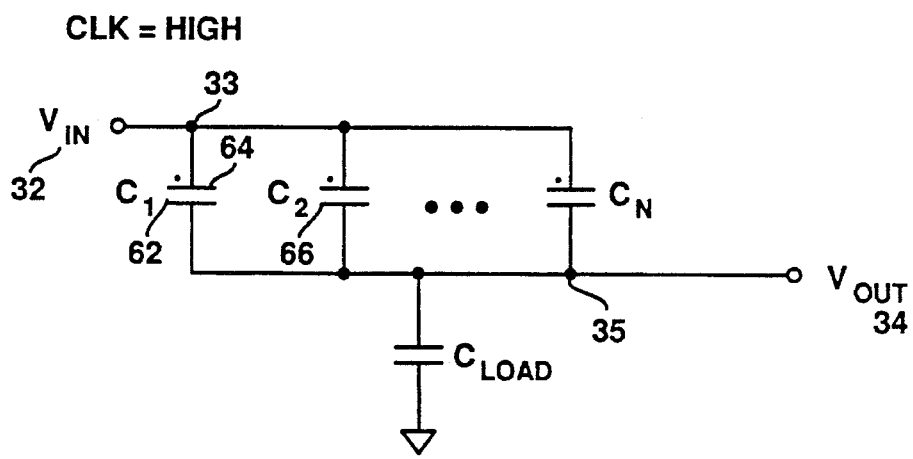
FIG. 7A illustrates one of the configurations of the half capacitive transformer of FIG. 6.
Figure 7B:
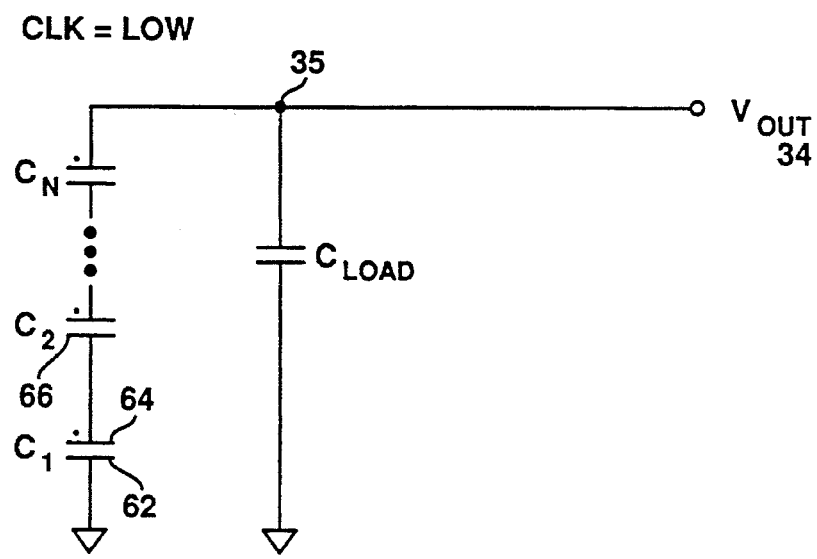
FIG. 7B illustrates the other configuration of the half capacitive transformer of FIG. 6.

Capacitive transformers can be built that provide different step-down ratios than ⅔. In general, the step-down ratio, R, of a capacitive transformer is described by:

$$R = \frac{N}{N+1}, \qquad \text{(Eq. 32)}$$

where N is an integer value representing the number of capacitors per half capacitive transformer. FIG. 6 illustrates schematically the equivalent half capacitive transformer 60 for an arbitrary number N. In one phase of CLK 37, HCXFR 60 couples all N capacitors in parallel between $V_{in}$ 32 and $V_{OUT}$ 34. In the other phase of CLK 37, HCXFR 60 couples all N capacitors in series between $V_{OUT}$ 34 and ground. The switching circuitry of HCXFR 60 in this phase couples the bottom plate of one capacitor to the top plate of the adjacent capacitor. Thus, for example, the bottom plate 62 of capacitor C1 is coupled to ground and its top plate 64 is coupled to the bottom plate 66 of capacitor C2. In other words, during its two phases CLK 37 switches HCXFR 60 between the two configurations illustrated in FIGS. 7A and 7B.

Figure 8:
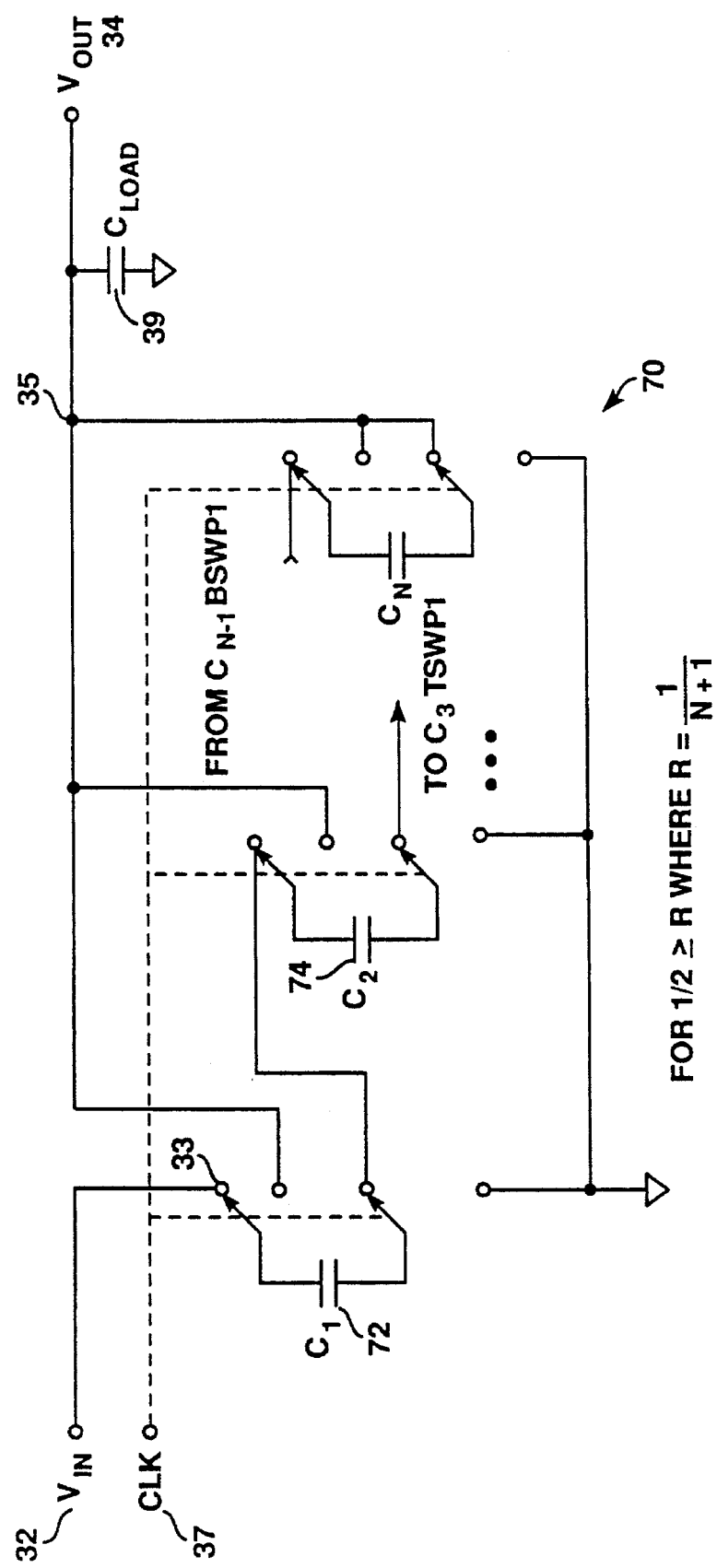
FIG. 8 illustrates schematically the general form of a half capacitive transformer having a step-down ratio less than or equal to ½.
Figure 9A:
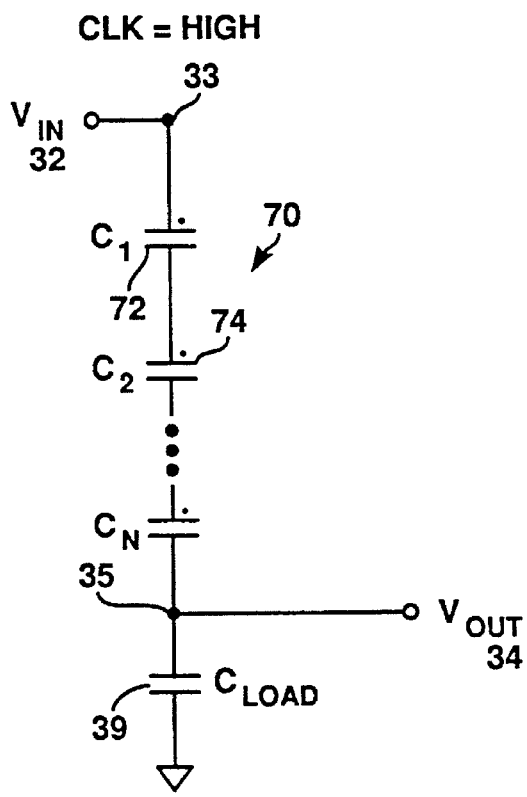
FIG. 9A illustrates one of the configurations of the half capacitive transformer of FIG. 8.
Figure 9B:
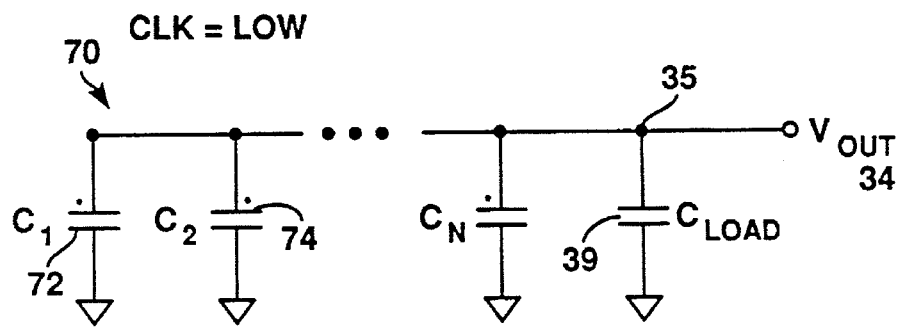
FIG. 9B illustrates the other configuration of the half capacitive transformer of FIG. 8.

The range of step-down ratios possible using HCXFR 60 is 1>R≧½. Step-down ratios smaller than ½ can be provided using alternative HCXFR 70 of FIG. 8. HCXFR 70 includes an arbitrary number, N, of capacitors and switching circuitry controlled by CLK 37. The switching circuitry switches HCXFR 70 between two configurations, which are illustrated in FIGS. 9A and 9B. While CLK 37 is active high, the switching circuitry couples all N capacitors in series between $V_{in}$ 32 and $V_{out}$ 34, as shown in FIG. 9A. This is because while CLK is active the bottom plate of each capacitor is coupled to the top plate of its adjacent upstream neighbor by the switching circuitry. Thus, the bottom plate 72 of capacitor $C_1$ is coupled to the top plate 74 of capacitor $C_2$, and so on. This is in contrast to HCXFR 60, in which all N capacitors are coupled in parallel between $V_{in}$ and $V_{out}$ while CLK 37 is active. FIG. 9B illustrates the configuration of HCXFR 70 while CLK 37 is inactive low. All N capacitors are coupled in parallel between $V_{out}$ 34 and ground. Recall that HCXFR 60 couples all N capacitors in series between $V_{out}$ 34 and ground while CLK is inactive.

HCXFR 70 provides a step-down ratio, R, given by:

$$R = \frac{1}{N+1}. \qquad \text{(Eq. 33)}$$

Thus, the range of step-down ratios possible using alternative HXCFR 70 is ½≧R>0.

Figure 10:
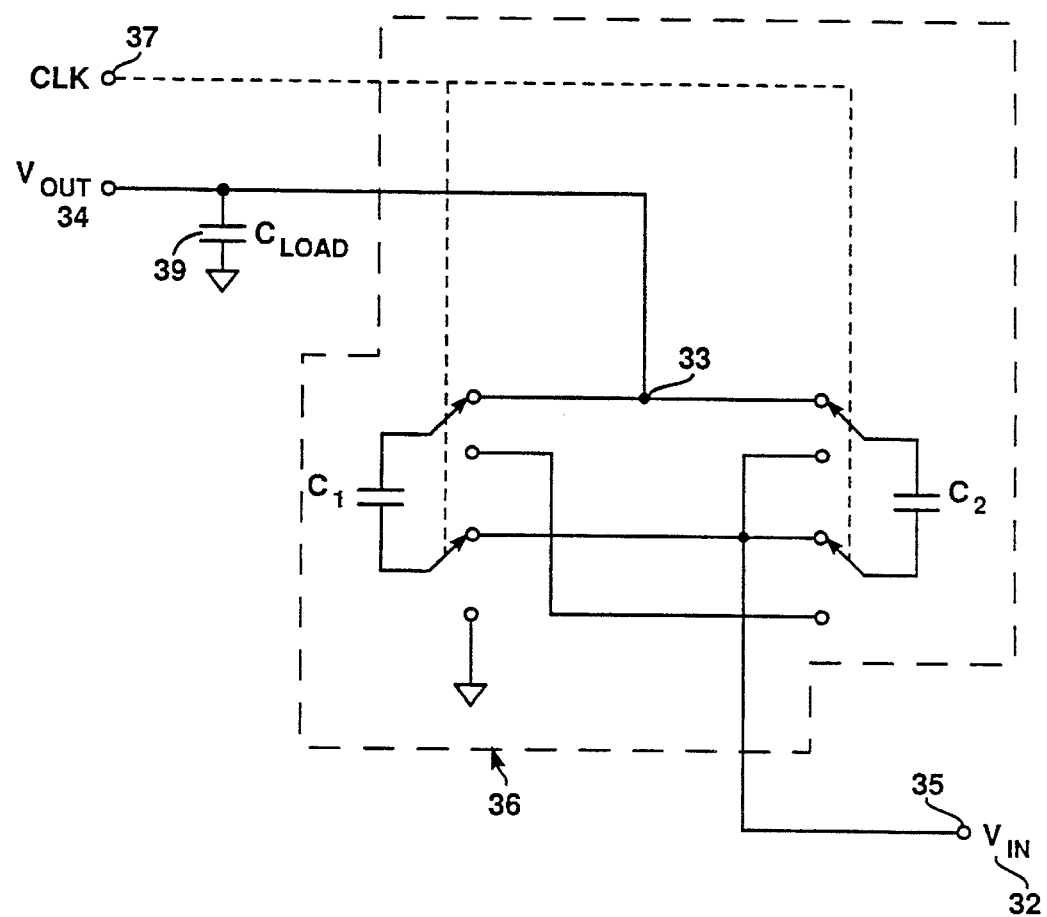
FIG. 10 illustrates schematically operation of a half capacitive transformer in step-up mode.

The discussion of capacitive transformer 30 has thus far been concerned only with step-down operation; i.e., stepping ratios of one or less. Capacitive transformer 30 can also operate as a step-up transformer by swapping the ports to which $V_{in}$ 32 is applied and from which $V_{out}$ 34 is sensed. FIG. 10 illustrates the coupling of $V_{in}$ 32 and $V_{out}$ 34 to HCXFR 36 for step-up operation. Thus, given a 3.3 volt input at port 2 35 HCXFR 36 outputs 5.0 volts at port 1 33. Note that $C_{LOAD}$ 39 is now connected at port 1 33 instead of port 2 35. Because the switching circuitry within HCXFR 36 requires 5 volts for proper operation, step up operation of HCXFR 36 is limited to those situations in which bootstrap operation of the capacitive transformer is acceptable. For example, the 5 volt swing necessary to operate the switching circuitry could be generated by switching control circuitry that is coupled to low-voltage input and the higher voltage output. As the output voltage rises, the output of the switching control circuitry would rise to approximately the output voltage level.

Figure 11:
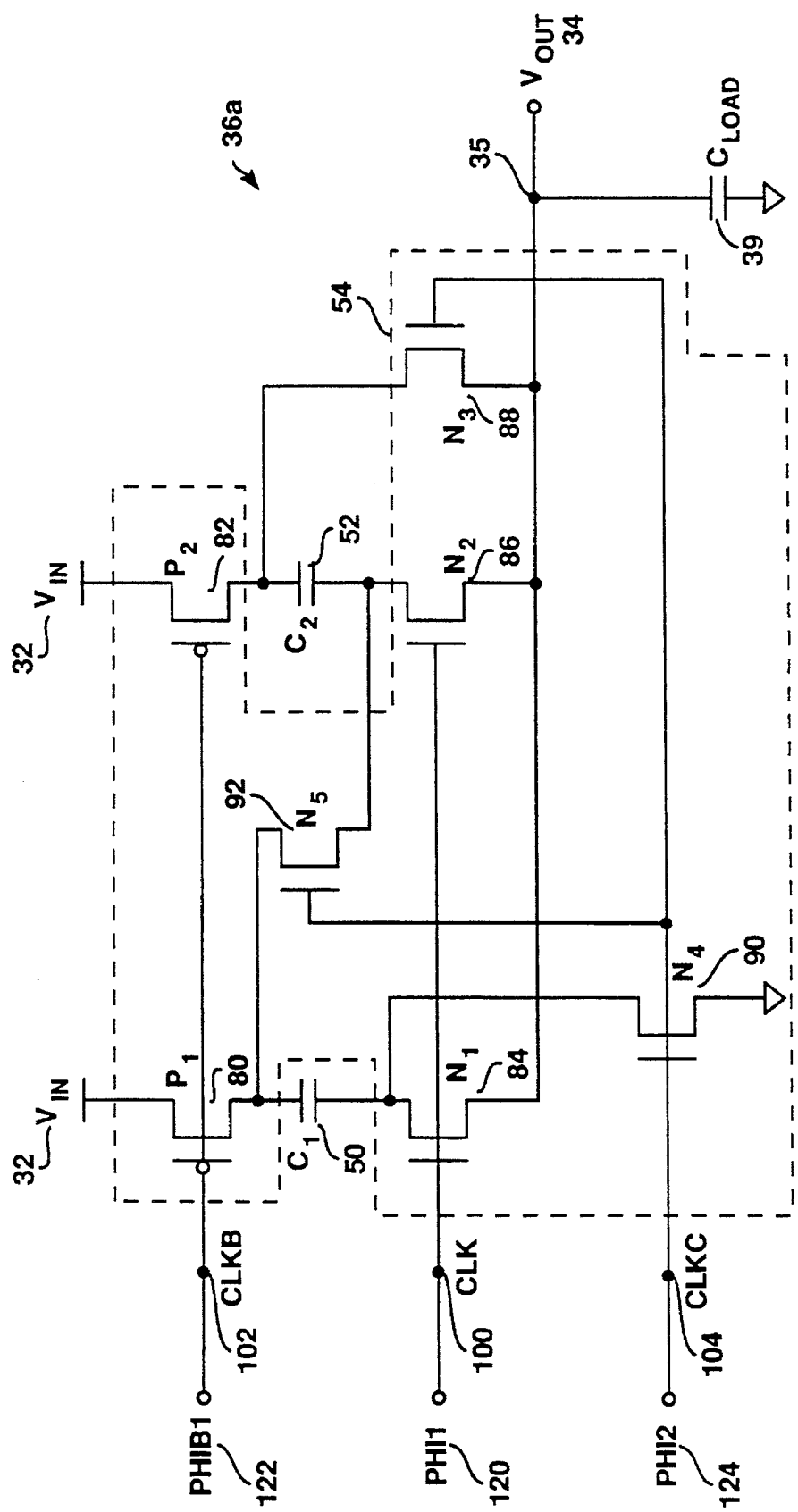
FIG. 11 illustrates schematically an embodiment of a half capacitive transformer.

FIG. 11 illustrates schematically an implementation 36a of HCXFR 36 suitable for fabrication as part of an integrated circuit. Switching circuitry 54 is realized using a number of transistors 80, 82, 84, 86, 88, 90 and 92 that function as switches. In other words, when transistors are conducting the voltage drop between their drain and source is close to 0 volts, and the switch is closed. Conversely, when the transistors are not conducting they are analogous to an open switch. Transistors $P_1$ 80 and $P_2$ 82 are P-type transistors, which conduct when the voltage applied to their gates is low. In contrast, transistor $N_1$ 84, $N_2$ 86, $N_3$ 88, $N_4$ 90 and $N_5$ 92 are N-type transistors, which conduct when the voltage applied to their gates is high. In one embodiment, the fabricated width of the transistors in microns is:

| | |
|---|---|
| transistors 80 and 82 | 120,000 |
| transistors 84 and 86 | 200,000 |
| transistor 88 | 280,000 |
| transistor 90 | 50,000 |
| transistor 92 | 75,000 |

These transistor widths are much larger than generally used in CMOS devices. However, there is no reason such widths cannot be implemented provided the devices fit into the available silicon area. Other transistor widths may be appropriate using other technologies, such as junction field effect transistors (JFET).

Figure 12:
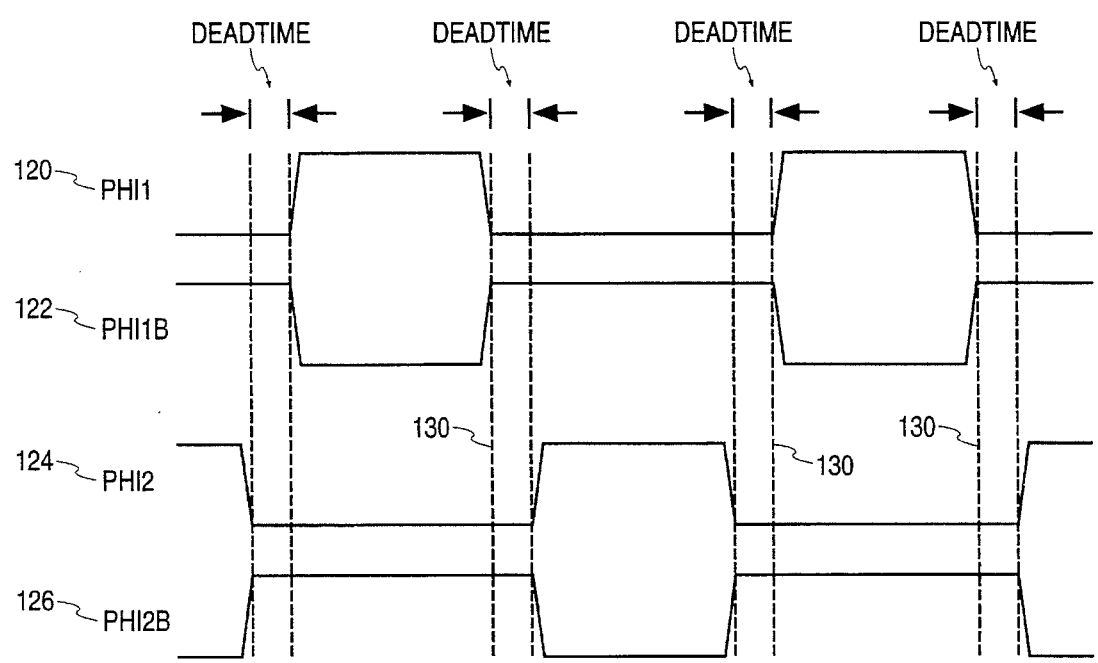
FIG. 12 is a timing diagram of the phasing signals coupled to the half capacitive transformer of FIG. 11.

Operating HCXFR 36a so that it can assume only the configurations of FIGS. 3A and 3B requires completely breaking all connections associated with one configuration before making any of the connections of another configuration. Implementing this "break before make" strategy dictates that transistors coupled to CLK port 100 and CLKB port 102 must never be active simultaneously with transistors coupled to CLKC port 104. The signals coupled to CLK port 100 and CLK B port 102 must be complementary because port 100 controls N-type transistors while port 102 controls P-type transistors. The signals applied to ports 100 and 104 must be non-overlapping complements. FIG. 12 is a timing diagram illustrating the relationship between phase signal PHl1 120 applied to port 100, phase signal PHl1B 122 applied to port 102 and phase signal PHl2 124 applied to port 104, as well as PHl2B 126. Let us call phase pair 120 and 122 and phase pair 124 and 126 "active" when the transistors controlled by the phase pair are conducting. Thus, signals 120 and 122 are active when PHl1 120 is high and PHl1B 122 is low, and signals 124 and 126 are active when PHl2 124 is high and PHl2B 126 is low. Analogously, phase pair signals 120 and 122 are inactive when PHl1 120 is low and PHl1B 122 is high. Note that active periods of phase pair 120 and 122 are separated from active periods of phase pair 124 and 126 by dead time 130, a period of time during which both pairs of phase signals are simultaneously inactive. As a result, transistors turned on by one phase pair are turned off before transistors controlled by the other phase pair are turned on.

Analysis of FIG. 12 confirms that HCXFR 36a operates as described. Consider first the operation of HCXFR 36a while phase pair 120 and 122 are active. During this period the high voltage level applied to port 100 causes transistors $N_1$ 84 and $N_2$ 86 to conduct, tying one plate of both capacitors to $V_{out}$ 34. Similarly, during this period the low voltage level applied to port 102 causes transistors $P_1$ 80 and $P_2$ 82 to conduct. As a result, one plate of capacitors 50 and 52 is coupled to $V_{in}$ 32. Because PHl2 is low during this phase transistors $N_3$ 88, $N_4$ 90 and $N_5$ 92 do not conduct and have no effect upon the configuration of HCXFR 36a. As a result, HCXFR 36a operates in the configuration illustrated in FIG. 3A while phase pair 120 and 122 is active.

During dead time 130 all transistors are turned off. Afterward, phase pair 124 and 126 becomes active. In response to the high voltage applied to port 104 transistors $N_3$ 88, $N_4$ 90 and $N_5$ 92 begin to conduct. This couples $C_1$ 50 between ground and capacitor $C_2$ 52 and couples capacitor $C_2$ 52 to $V_{OUT}$ 34. The voltage levels applied to ports 100 and 102 keep transistors 80, 82, 84 and 86 from conducting during this phase. Consequently, while phase pair 124 and 126 is active HCXFR 36a operates in the configuration of FIG. 3B.

Figure 13:
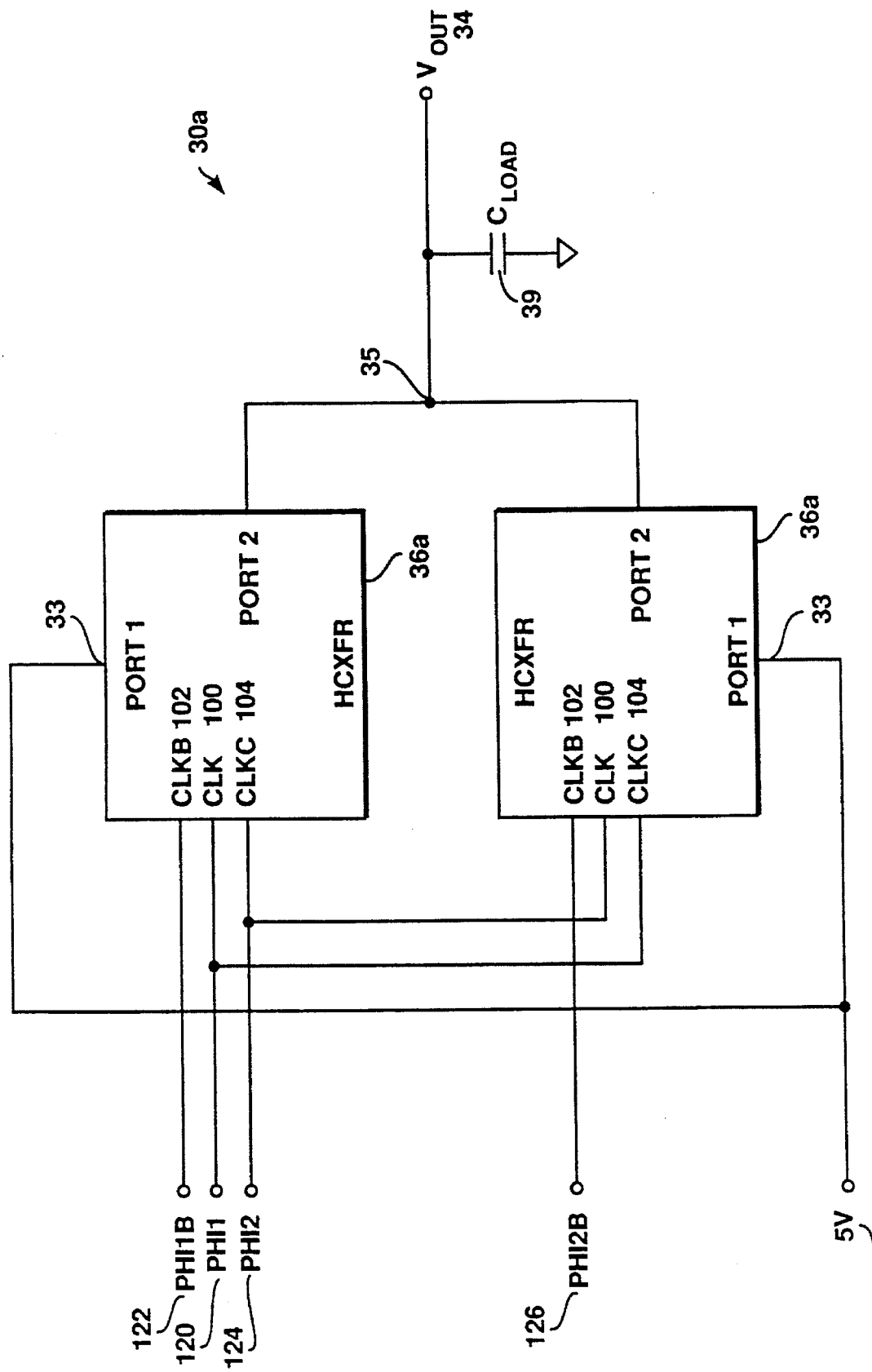
FIG. 13 is a block diagram of a capacitive transformer using the half capacitive transformer of FIG. 11.
Figure 14A:
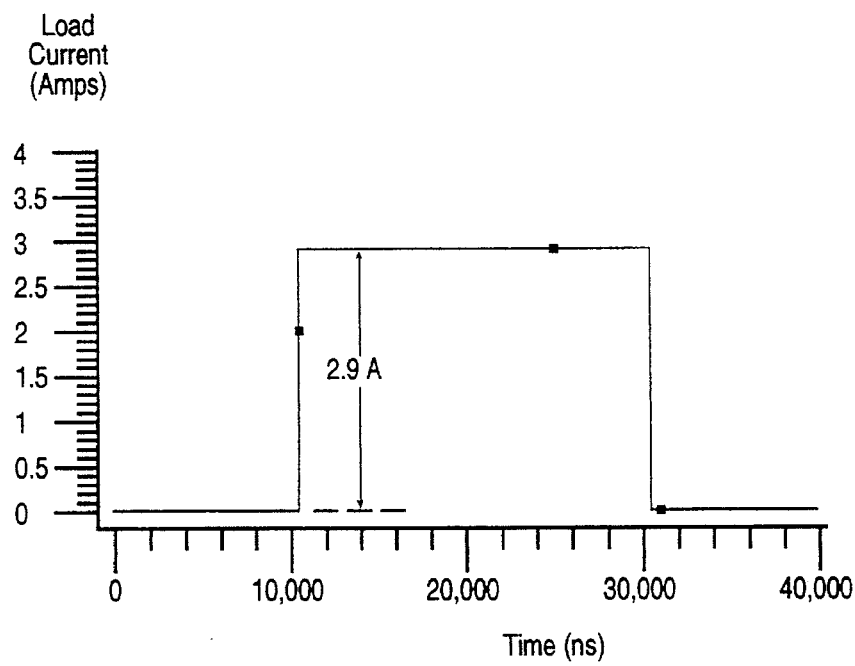
FIG. 14A illustrates a simulated change in load current of the capacitive transformer of FIG. 13.
Figure 14B:
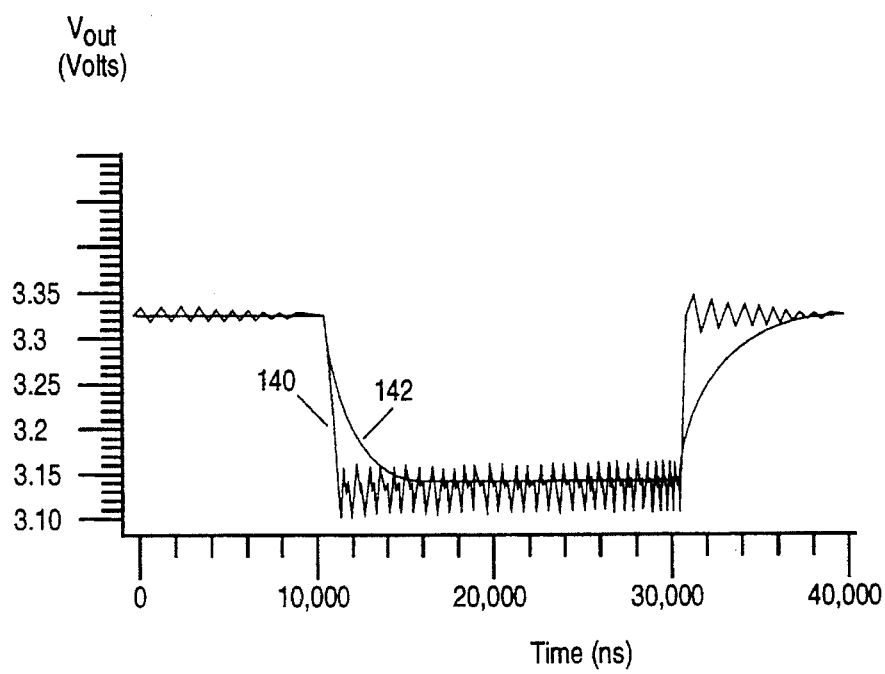
FIG. 14B illustrates the change in output voltage of the capacitive transformer of FIG. 13 in response to the change in load current.

FIG. 13 illustrates in block diagram form a capacitive transformer 30a that uses two HCXFRs 36a operating in antiphase. The response of CXFR 30a to a 2.9 amp change in load current lasting 20 ns was simulated for two different values of $C_{LOAD}$ 39: 1 µF and 20 µF. In both simulations the value of capacitors $C_1$ and $C_2$ was set to 10 µF. Line 140 of FIG. 14B shows that for $C_{LOAD}$ 39 equal to 1 µF $V_{OUT}$ 34 dips approximately 0.18 volts in response to the change in load current. Line 140 also displays some small amplitude ringing, approximately 0.05 volts. In contrast line 142 shows no ringing in $V_{out}$ 34 for $C_{LOAD}$ 39 equal to 20 µF, even though the dip in output voltage remains. This voltage dip is caused by the on resistance of the transistors. The smaller the on resistance, the smaller the dip. Ideal switches, which have zero on resistance, would not produce a voltage dip.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A transformer for transforming an input voltage at a first node into an output voltage at a second node, the transformer comprising:

a) a first capacitor;

b) a second capacitor; and c) a first switching means responsive to a clock signal, the clock signal having a first phase and a second phase, the first switching means coupling the first capacitor and the second capacitor in parallel between the first node and the second node in the first phase of the clock signal, the first switching means coupling the first capacitor and the second capacitor in series between the second node and a third node in the second phase of the clock signal.

2. The transformer of claim 1 further comprising:

d) a third capacitor;

e) a fourth capacitor; and f) a second switching means responsive to the clock signal, the second switching means coupling the third capacitor and the fourth capacitor in series between the second node and the third node in the first phase of the clock signal, the second switching means coupling the third capacitor and the second capacitor in parallel between the first node and the second node in the second phase of the clock signal.

3. The transformer of claim 2 further comprising a load capacitor coupled between the second node and the third node.

4. The transformer of claim 3 wherein the third node is ground.

5. The transformer of claim 3 wherein the first capacitor, the second capacitor, the third capacitor and the fourth capacitor have a first value of capacitance.

6. The transformer of 5 wherein the load capacitor has a second value of capacitance that is greater than the first value.

7. The transformer of claim 1 wherein the first switching means comprises:

a) a second switching means responsive to the clock signal, the second switching means coupling the first capacitor between the first node and the second node during the first phase of the clock signal, the second switching means coupling the first capacitor between the third node and a fourth node during the second phase of the clock signal; and b) a third switching means responsive to the clock signal, the third switching means coupling the second capacitor between the first node and the second node during the first phase of the clock signal, the third switching means coupling the second capacitor between the second node and the fourth node during the second phase of the clock signal.

8. The transformer of claim 7 further comprising:

d) a third capacitor;

e) a fourth capacitor; and f) a fourth switching means responsive to the clock signal, the fourth switching means coupling the third capacitor and the fourth capacitor in series between the second node and the third node in the first phase of the clock signal, the fourth switching means coupling the third capacitor and the second capacitor in parallel between the first node and the second node in the second phase of the clock signal.

9. The transformer of claim 8 wherein the fourth switching means comprises:

a) a fifth switching means responsive to the clock signal, the fifth switching means coupling the third capacitor between the third node and the fourth node during the first phase of the clock signal, the fifth switching means coupling the third capacitor between the first node and the second node during the second phase of the clock signal; and b) a sixth switching means responsive to the clock signal, the sixth switching means coupling the fourth capacitor between the second node and the fourth node during the first phase of the clock signal, the sixth switching means coupling the fourth capacitor between the first node and the second node during the second phase of the clock signal.

10. The transformer of claim 9 further comprising a load capacitor coupled between the second node and the third node.

11. The transformer of claim 10 wherein the third node is ground.

12. The transformer of claim 10 wherein the first capacitor, the second capacitor, the third capacitor and the fourth capacitor have a first value of capacitance.

13. The transformer of claim 12 wherein the load capacitor has a second value of capacitance that is greater than the first value.

14. A transformer for transforming an input voltage at a first node into an output voltage at a second node, the transformer comprising:

a) a first capacitor;

b) a second capacitor; and c) a first switching circuit responsive to a clock signal, the clock signal having a first phase and a second phase, the first switching circuit coupling the first capacitor and the second capacitor in series between the first node and the second node in the first phase of the clock signal, the first switching circuit coupling the first capacitor and the second capacitor in parallel between a third node and the second node in the second phase of the clock signal.

15. The transformer of claim 14 further comprising a load capacitor coupled between the second node and the third node.

16. The transformer of claim 15 wherein the third node is ground.

17. The transformer of claim 15 wherein the first capacitor and the second capacitor have a first value of capacitance.

18. The transformer of claim 17 wherein the load capacitor has a second value of capacitance that is greater than the first value.

19. The transformer of claim 14 wherein the first switching circuit comprises:

a) a second switching circuit responsive to the clock signal, the second switching circuit coupling the first capacitor between a fourth node and the first node during the first phase of the clock signal, the second switching circuit coupling the first capacitor between the second node and the third node dudng the second phase of the clock signal; and b) a third switching circuit responsive to the clock signal, the third switching circuit coupling the second capacitor between the fourth node and the second node during the first phase of the clock signal, the third switching circuit coupling the second capacitor between the second node and the third node during the second phase of the clock signal.

20. The transformer of claim 19 further comprising a load capacitor coupled between the second node and the third node.

21. The transformer of claim 20 wherein the third node is ground.

22. The transformer of claim 20 wherein the first capacitor and the second capacitor have a first value of capacitance.

23. The transformer of claim 22 wherein the load capacitor has a second value of capacitance that is greater than the first value.

24. The transformer of claim 14 further comprising:

d) a third capacitor;

e) a fourth capacitor; and f) a fourth switching circuit responsive to the clock signal, the fourth switching circuit coupling the third capacitor and the fourth capacitor in parallel between the second node and the third node during the first phase of the clock signal, the fourth switching circuit coupling the third capacitor and the fourth capacitor in series between the first node and the second node during the second phase of the clock signal.

25. The transformer of claim 24 wherein the fourth switching circuit comprises:

a) a fifth switching circuit responsive to the clock signal, the fifth switching circuit coupling the third capacitor between the second node and the third node during the first phase of the clock signal, the fifth switching circuit coupling the third capacitor between a fourth node and the first node during the second phase of the clock signal; and b) a sixth switching circuit responsive to the clock signal, the sixth switching circuit coupling the fourth capacitor between the second node and the third node during the first phase of the clock signal, the sixth switching circuit coupling the fourth capacitor between the fourth node and the second node during the second phase of the clock signal.

26. The transformer of claim 25 further comprising a load capacitor coupled between the second node and the third node.

27. The transformer of claim 26 wherein the third node is ground.

28. The transformer of claim 27 wherein the first capacitor and the second capacitor have a first value of capacitance.

29. The transformer of claim 28 wherein the load capacitor has a second value of capacitance that is greater than the first value.

30. A transformer for transforming an input voltage into an output voltage, the input voltage being coupled to a first node and the output voltage being output at a second node, the capacitive transformer being coupled to a clock signal having a first phase and a second phase, the transformer comprising:

a) a first half capacitive transformer having a first port coupled to the first node during the first phase of the clock signal, the first half capacitive transformer having a second port coupled to the second node; and b) a second half capacitive transformer having a first port coupled to the first port during the second phase of the clock signal, the second half capacitive transformer having a second port coupled to the second node.

31. The transformer of claim 30 wherein the first half capacitive transformer comprises:

a) a first set of capacitors, the first set including a first number of capacitors;

b) a first switching circuit responsive to the clock signal, the first switching circuit coupling the first set of capacitors in parallel with each other between the second port and the first port during the first phase of the clock signal, the first switching circuit coupling the first set of capacitors in series between the second port and a third node during the second phase of the clock signal.

32. The transformer of claim 31 wherein the second half capacitive transformer comprises:

a) a second set of capacitors, the second set including the first number of capacitors; and b) a second switching circuit responsive to the clock signal, the second switching circuit coupling the second set of capacitors in series between the second port and the third node during the first phase of the clock signal, the second switching circuit coupling the second set of capacitors in parallel with each other between the second port and the first port during the second phase of the clock.

33. The transformer of claim 32 further comprising a load capacitor coupled between the second node and the third node.

34. The transformer of claim 33 wherein the third node is ground.

35. The transformer of claim 34 wherein each capacitor in the first set and the second set has a capacitance equal to a first value.

36. The transformer of claim 35 wherein the load capacitor has a second value of capacitance greater than the first value.

37. The transformer of claim 30 wherein the first half capacitive transformer comprises:

a) a first set of capacitors, the first set including a first number of capacitors; and b) a first switching circuit responsive to the clock signal, the first switching circuit coupling the first set of capacitors in series with each other between the first port and the second port during the first phase of the clock signal, the first switching circuit coupling the first set of capacitors in parallel with each other between a third node and the second port during the second phase of the clock signal.

38. The transformer of claim 37 wherein the second half capacitive transformer comprises:

a) a second set of capacitors, the second including the first number of capacitors; and b) a second switching circuit responsive to the clock signal, the second switching circuit coupling the second set of capacitors in parallel with each other between the third node and the second port during the first phase of the clock signal, the second switching circuit coupling the second set of capacitors in series with each other between the second port and the first port during the second phase of the clock signal.

39. The transformer of claim 38 further comprising a load capacitor coupled between the second node and the third node.

40. The transformer of claim 39 wherein the third node is ground.

41. The transformer of claim 39 wherein each capacitor in the first set and the second set has a capacitance equal to a first value.

42. The transformer of claim 41 wherein the load capacitor has a second value of capacitance that is greater than the first value.

43. A transformer for transforming a direct current input voltage into an output voltage, the input voltage being coupled to a first node and the output voltage being output on a second node, the transformer being coupled to a first pair of phase signals and a second pair of phase signals that are complementary and nonoverlapping, the transformer comprising:

a) a first half capacitive transformer including a pair of capacitors and having a first port coupled to the first node while the first pair of phase signals is active and the second pair of phase signals is inactive, the first half capacitive transformer having a second port coupled to the second node; and b) a second half capacitive transformer including a pair of capacitors and having a first port coupled to the first node while the first pair of phase signals is inactive and the second pair of phase signals is active, the second half capacitive transformer having a second port coupled to the second node.

44. The transformer of claim 43 wherein the first half capacitive transformer and the second half capacitive transformer each comprise:

a) a pair of capacitors having equal capacitance;

b) a pair of P-type transistors, each of the pair of P-type transistors being coupled between the first port and a one of the pair of capacitors, conduction of the each P-type transistors being controlled by a first control signal, the first control signal being a one of a first selected pair of phase signals, the first selected pair of phase signals being a one of the first and second pair of phase signals.

45. The transformer of claim 44 wherein the first half capacitive transformer and the second half capacitive transformer each further comprise:

c) a first set of N-type transistors, each N-type transistor being coupled between a one of the pair of capacitors and the second port, conduction of the first set of N-type of transistors being controlled by a second control signal, the second control signal being the other one of the first selected pair of phase signals.

46. The transformer of claim 44 wherein the first half capacitive transformer and the second half capacitive transformer each further comprise:

d) a second set of N-type transistors, each coupled to a one of the pair of capacitors, conduction of each of the second set of N-type transistors being controlled by a third control signal, the third control signal being a one of a second selected pair of phase signals, the second selected pair of phase signals being a one of the first and second pair of phase signals other than the first selected pair of phase signals.

47. The transformer of claim 46 wherein the second set of N-type transistors includes:
   a) a first N-type transistor coupled between a first one of the pair of capacitors and ground.

48. The transformer of claim 47 wherein the second set of N-type transistors includes:
   a) a second N-type transistor coupled between the pair of capacitors.

49. The transformer of claim 48 wherein the second set of N-type transistors includes a third N-type transistor coupled between the second one of the pair of capacitors and the second port.

50. The transformer of claim 49 further comprising a load capacitor coupled between the second node and ground, the load capacitor having a first value.

51. The capacitive transformer of claim 50 wherein each of the pair of capacitors have a second value of capacitance that is less than the first value of capacitance.

52. A capacitive transformer for stepping an input voltage up to an output voltage, the capacitive transformer being coupled to a clock signal having a first phase and a second phase, the output voltage being output at a first node and the input voltage being coupled to a second node, the capacitive transformer comprising:
   a) a first half capacitive transformer including a pair of capacitors and having a first port coupled to the first node during the first phase of the clock signal, the first half capacitive transformer having a second port coupled to the second node; and
   b) a second half capacitive transformer including a pair of capacitors and having a first port coupled to the first node during the second phase of the clock signal, the second half capacitive transformer having a second port coupled to the second node.

53. The capacitive transformer of claim 52 wherein the first half capacitive transformer comprises:
   a) a first set of capacitors, the first set including a first number of capacitors; and
   b) a first switching circuit responsive to the clock signal, the first switching circuit coupling the first set of capacitors in parallel with each other between the first port and the second port during the first phase of the clock signal, the first switching circuit coupling the first set of capacitors in series between a third node and the second port during the second phase of the clock signal.

54. The capacitive transformer of claim 53 wherein the second half capacitive transformer comprises:
   a) a second set of capacitors, the second set including the first number of capacitors; and
   b) a second switching circuit responsive to the clock signal, the second switching circuit coupling the second set of capacitors in series between the third node and the second port during the first phase, the second switching circuit coupling the second set of capacitors in parallel with each between the first port and the second port during the second phase of the clock signal.

55. The capacitive transformer of claim 54 further comprising a load capacitor coupled between the first node and the third node.

56. The capacitive transformer of claim 55 wherein the third node is ground.

57. The capacitive transformer of claim 55 wherein each capacitor in the first set and the second set of capacitors has a capacitance equal to a first value.

58. The capacitive transformer of claim 57 wherein the load capacitor has a second value of capacitance greater than the first value.

59. The capacitive transformer of claim 52 wherein the first half capacitive transformer comprises:
   a) a first set of capacitors, the first set including a first number of capacitors; and
   b) a first switching circuit responsive to the clock signal, the first switching circuit coupling the first set of capacitors in series with each other between the first port and the second port during the first phase of the clock signal, the first switching circuit coupling the first set of capacitors in parallel with each other between a third node and the second port during the second phase of the clock signal.

60. The capacitive transformer of claim 59 wherein the second half capacitive transformer comprises:
   a) a second set of capacitors, the second set including the first number of capacitors; and
   b) a second switching circuit responsive to the clock signal, the second switching circuit coupling the second set of capacitors in parallel with each other between the second port and the third node during the first phase of the clock signal, the second switching circuit coupling the second set of capacitors in series with each other between the first port and the second port during the second phase of the clock signal.

61. The capacitive transformer of claim 60 further comprising a load capacitor coupled between the first node and the third node.

62. The capacitive transformer of claim 61 wherein the third node is ground.

63. The capacitive transformer of claim 61 wherein each capacitor in the first set and the second set has a capacitance equal to a first value.

64. The capacitive transformer of claim 63 wherein the load capacitor has a second value of capacitance greater than the first value.

\* \* \* \* \*

UNITED STATES PATENT AND TRADEMARK OFFICE
CERTIFICATE OF CORRECTION

PATENT NO. : 5,596,489
DATED : January 21, 1997
INVENTOR(S) : Mel Bazes

It is certified that error appears in the above-identified patent and that said Letters Patent is hereby corrected as shown below:

In column 1 at line 56 delete "lcad" and insert --load--

In column 5 at line 47 delete "1/3" and insert --2/3--

In column 12 at line 11 delete "dudng" and insert --during--

Signed and Sealed this

Sixth Day of May, 1997

Attest:

BRUCE LEHMAN

Attesting Officer

Commissioner of Patents and Trademarks